(12) United States Patent  (10) Patent No.: US 6,515,434 B1
Biebl  (45) Date of Patent: Feb. 4, 2003

(54) CONTROL CIRCUIT FOR LED AND CORRESPONDING OPERATING METHOD

(75) Inventor: Alois Biebl, St. Johann (DE)

(73) Assignee: Patent-Treuhand-Gesellschaft fuer Elektrische Gluehlampen mbH, Munich (DE)

( * ) Notice: Subject to any disclaimer, the term of this patent is extended or adjusted under 35 U.S.C. 154(b) by 0 days.

(21) Appl. No.: 09/857,502

(22) PCT Filed: Apr. 1, 2000

(86) PCT No.: PCT/DE00/00988

§ 371 (c)(1),
(2), (4) Date: Jun. 6, 2001

(87) PCT Pub. No.: WO01/30119

PCT Pub. Date: Apr. 26, 2001

(30) Foreign Application Priority Data

Oct. 18, 1999 (DE) .......................... 199 50 135

(51) Int. Cl.$^7$ .................................. G05F 1/00
(52) U.S. Cl. ................. 315/291; 315/185 R; 315/224; 362/800
(58) Field of Search ............ 315/169.1–169.4, 315/200 A, 185 R, 224, 241 S, 241 P, 291, 307, 360; 362/555, 800, 235, 227; 313/500

(56) References Cited

U.S. PATENT DOCUMENTS

| 5,144,117 A | * | 9/1992 | Hasegawa et al. .......... 315/297 |
| 5,598,068 A | | 1/1997 | Shirai ..................... 315/185 R |
| 5,907,569 A | | 5/1999 | Glance et al. ......... 372/29.021 |
| 6,111,367 A | * | 8/2000 | Asano et al. ................ 315/291 |
| 6,161,910 A | * | 12/2000 | Reisenauer et al. ......... 315/158 |
| 6,208,073 B1 | * | 3/2001 | Wang et al. ................. 313/500 |
| 6,351,079 B1 | * | 2/2002 | Willis ..................... 315/200 A |
| 6,362,578 B1 | * | 3/2002 | Swanson et al. ........ 315/209 R |
| 6,396,466 B1 | * | 5/2002 | Pross et al. ................. 340/468 |
| 6,400,101 B1 | * | 6/2002 | Biebl et al. ............. 315/185 R |

FOREIGN PATENT DOCUMENTS

| DE | 90 02 812.0 | 6/1990 |
| DE | 197 49 333 | 3/1999 |
| DE | 299 00 537 | 7/1999 |
| EP | 0 216 348 | 4/1987 |
| EP | 0 896 899 | 2/1999 |

* cited by examiner

Primary Examiner—Don Wong
Assistant Examiner—Ephrem Alemu
(74) Attorney, Agent, or Firm—Carlo S. Bessone

(57) ABSTRACT

A drive circuit for an LED array, comprising at least two clusters of LEDs, in which one cluster comprises a number of LEDs arranged in series which are connected to a supply voltage ($U_{Batt}$), with a semiconductor switch (T) being arranged in series between each LED cluster and the associated supply voltage, which semiconductor switch (T) allows the LED current to be supplied in a pulsed manner, with a measurement resistor ($R_{Shunt}$) being arranged in series with the LEDs in the path for the forward current $I_F$ between the LEDs and ground. A control loop controls the semiconductor switch (T1) in a first LED cluster, referred to as the master cluster in the following text, such that a constant mean value of the LED current is achieved, wherein the master cluster has a predetermined number X of LEDs in its cluster, and with this control loop also driving at least the semiconductor switch (T2) in a further, LED cluster, referred to in the following text as the slave cluster.

7 Claims, 7 Drawing Sheets

CONTROL CIRCUIT FOR LED AND CORRESPONDING OPERATING METHOD

The present application hereby expressly incorporates by reference U.S. Pat. No. 6,400,101.

The invention is based on a drive circuit for LEDs and an associated operating method. This relates in particular to reducing the drive power losses in light-emitting diodes (LEDs) by means of a pulsed LED drive circuit.

As a rule, series resistors are used for current limiting when driving light-emitting diodes (LEDs), see, for example, U.S. Pat. No. 5,907,569. A typical voltage drop across light-emitting diodes ($U_F$) is a few volts (for example, for Power TOPLED $U_F$=2.1 V). The known resistor $R_v$ in series with the LED (see FIG. 1 in U.S. Pat. No. 6,400,101) produces a particularly high power loss, particularly if the battery voltage $U_{Batt}$ is subject to major voltage fluctuations (as is normal in motor vehicles). The voltage drop across the LED still remains constant even when such voltage fluctuations occur, that is to say the residual voltage across the series resistor $R_v$ falls. $R_v$ is thus alternately loaded to a greater or lesser extent. In practice, a number of LEDs are generally connected in series (cluster) in order to achieve better drive efficiency (FIG. 2 in U.S. Pat. No. 6,400,101). Depending on the vehicle power supply system (12 V or 42 V), an appropriate number of LEDs can be combined to form a cluster. With a 12 V vehicle power supply system, there is a lower limit on the battery voltage $U_{Batt}$ down to which legally specified safety devices (for example the hazard warning system) must be functional. This is 9 volts. This means that, in this case, up to 4 Power TOPLEDs can be combined to form a cluster (4×2.1 V=8.4 V).

Furthermore, U.S. Pat. No. 6,400,101 describes the use of a pulsed LED drive to reduce the drive power loss in light-emitting diodes (LEDs). When the LEDs are driven in this way, the current is regulated autonomously in each individual LED cluster. This leads to the maximum possible reliability (intelligent LED driver module, see FIG. 4 in U.S. Pat. No. 6,400,101). However, a relatively large number of LED driver modules are required to illuminate a relatively large area—as is the case with motor vehicle tail lights—using this technique, and this results in considerable costs. The number of LED driver modules depends on two factors.

The smaller the available supply voltage $U_v$ for the LED cluster, the greater is the number of clusters required.

The greater the forward voltage drop $U_F$ across the LEDs which are intended to be used for an LED cluster, the smaller is the number of LEDs which can be used in one cluster.

The greater the number of LED driver modules required, the greater are the costs.

The requirements to which an LED drive as described in U.S. Pat. No. 6,400,101 is subject are, of course, complied with, for example temperature regulation and fault identification are possible in the LED cluster.

One object of the present invention is to provide a drive circuit for LEDs which is simpler and thus considerably more cost-effective.

This object is achieved by the distinguishing features of claim 1. Particularly advantageous refinements can be found in the dependent claims.

The fundamental principle of the present invention is to cascade the already known drive system. An LED drive based on the concept in U.S. Pat. No. 6,400,101 is simplified in that the basic drive clock is governed by the clock (CLK) of the transistor T1 in a first higher-level LED cluster, which is referred to as the "master" in the following text, at the output of the comparator of the associated control loop, and this clock is also made available to other lower-level LED clusters (slaves) (FIG. 1). The resistors $R_{SSn}$ connected in series with the LEDs represent optional additional shunt resistors $R_{Shunt}$. These are not absolutely essential in operation, since their values are chosen to be very small (for example, $R_{SS1}$=1Ω) and they do not adversely affect the setting of the forward current $I_F$. However, if interruption identification is intended to be carried out in the slave clusters (see below) they are essential.

This concept in principle allows an area of any desired size to be illuminated using a single control loop. This is so-called master/slave current regulation, with the master cluster predetermining the clock (CLK) and all the additional LED clusters (slave clusters) being driven by the master clock.

In the simplest embodiment, only one master cluster is used. This solution is particularly cost-effective. However, in this case, it is advantageous to ensure that the number of LEDs in the slave clusters is the same as the number in the single master cluster. Otherwise, brightness and light intensity differences would occur.

In one particularly preferred embodiment, the number of LEDs in the clusters can be varied. In this case, there are two different embodiments for driving the LED clusters which have different numbers of LEDs (for example if the number of LEDs in the master cluster is greater):

In a first variant, a series load (resistor, zener diode or the like), in particular a series resistor $R_{xn}$, is connected in each n-th slave cluster, replacing the missing light-emitting diode (or light-emitting diodes). In this case, the master clock is the drive clock of that LED cluster which is driving the greatest number of light-emitting diodes (FIG. 2). The number of LEDs in the other clusters (slave clusters) may in this case be chosen to be the same, or less. It is advantageously not more than 30% less than the number in the master cluster, in order to avoid the losses becoming too large.

In a second variant, one or more additional LED control loops (second or third, etc. master control loop) is or are integrated in the LED drive module (IC), whose LED cluster operates with a smaller number of LEDs than the first master cluster. The battery voltage $U_{Batt}$ is in this case connected to all the transistors T. The drive clock of the second master control loop (CLK2) is then made available to the group of slave clusters having the corresponding, lesser number of LEDs (FIG. 3). This embodiment is suitable for groups of LED clusters which each have the same number of LEDs.

The failure rate of a master cluster is preferably also improved. This is because the master clock is no longer available to any of the connected slaves if the master fails, for whatever reason (for example interruption) The slaves are no longer driven, and must then likewise be switched off to protect them against destruction.

One of the slave clusters is thus advantageously in the form of a reserve master cluster. This means that a means is provided for identifying an interruption in the control loop of the master cluster and this means, for its part, is connected to a changeover switch in the control loop, with the changeover switch being connected on the one hand to the master cluster and on the other hand to the reserve master cluster. If the master fails, the switch is then changed to the reserve master cluster (FIG. 4). This redundancy ensures that, if the master is operating incorrectly (interruption), an immediate change is made to the reserve master. This ensures that the connected slaves (not shown) continue to receive their drive clock (master clock) for operation.

The reserve master is preferably used as a slave as long as the master 1 is operating normally.

Fault identification (malfunction) in the LED cluster is also preferably improved. The commonest fault types are interruptions and short-circuits. An LED failure always means an interruption. In this case, this means an interruption in the LED cluster, that is to say at least one LED has failed.

Nevertheless, it is possible for a short-circuit to occur, to be precise in the sense of an interruption in the electrical connecting line between the LED anode (A1) and ground (GND), see FIG. 5. Especially for use in motor vehicles (for example a tail light composed of LEDs), this type of fault must be detected so that appropriate countermeasures can be initiated in the event of a fault, such as immediately switching off the LED driver module or switching off only the short-circuited load circuit (LED cluster). The "short-circuit" fault type can be caused, for example, by a rear impact in which the tail light is damaged.

Fault identification in all the clusters is thus highly recommended. For this purpose, detector inputs for the slave clusters are required in the driver module (IC), to be precise preferably a first input for interruption identification (FIG. 5, OL) and a second input for short-circuit identification (SC in FIG. 5). OL stands for "open load" (interruption), while SC stands for short circuit.

The total number of detector inputs is governed by the number of slave clusters which are intended to be monitored. Normally, two module inputs are required per slave cluster.

The fundamental elements of an LED drive circuit are described in U.S. Pat. No. 6,400,101. Now, as shown in FIG. 5, elements are added for operation based on the master-slave method. For completeness, all of these are quoted here:

- constant-current regulation of the forward current ($I_F$ = constant) for the LEDs
- external, and thus flexible, forward-current adjustment
- low power loss due to switched operation (no need for the large series resistor $R_v$)
- interruption identification in the LED cluster
- short-circuit identification on the LED cluster
- temperature regulation in order to protect the LEDs
- flexibility in driving different numbers of LEDs in the clusters, by means of a second LED master control loop
- drive clock output (clock output) from the master 1 and the master 2 for the associated slave clusters with equal numbers of LEDs
- increase in reliability by master switching
- logic drive (microcontroller-compatible ENABLE input)
- low intrinsic current draw by the drive circuit in operation and in the standby mode
- resistant to polarity reversal (integrated in the IC, or can be provided externally by connector coding)
- overvoltage protection
- compact housing (for example Power SO housing for SMD technology)
- temperature range $-40° C. \leq T_j < 150° C.$
- 42 V motor vehicle power supply system (also feasible for 12 V motor vehicle power supply system).

FIGURES

The invention will be explained in more detail in the following text with reference to a number of exemplary embodiments. In the figures:

FIG. 1 shows the basic principle of pulsed current regulation for LEDs based on the master-slave principle FIG. 2 shows a further exemplary embodiment of a drive circuit with different numbers of LEDs in the individual clusters FIG. 3 shows a further exemplary embodiment of a drive circuit having two master clusters FIG. 4 shows a further exemplary embodiment of a drive circuit having a reserve master cluster FIG. 5 shows a basic block diagram of an LED drive circuit of pulsed current regulation for LEDs FIG. 6 shows an LED drive circuit without fault identification FIG. 7 shows an LED drive circuit with complete fault identification.

Figure 1:
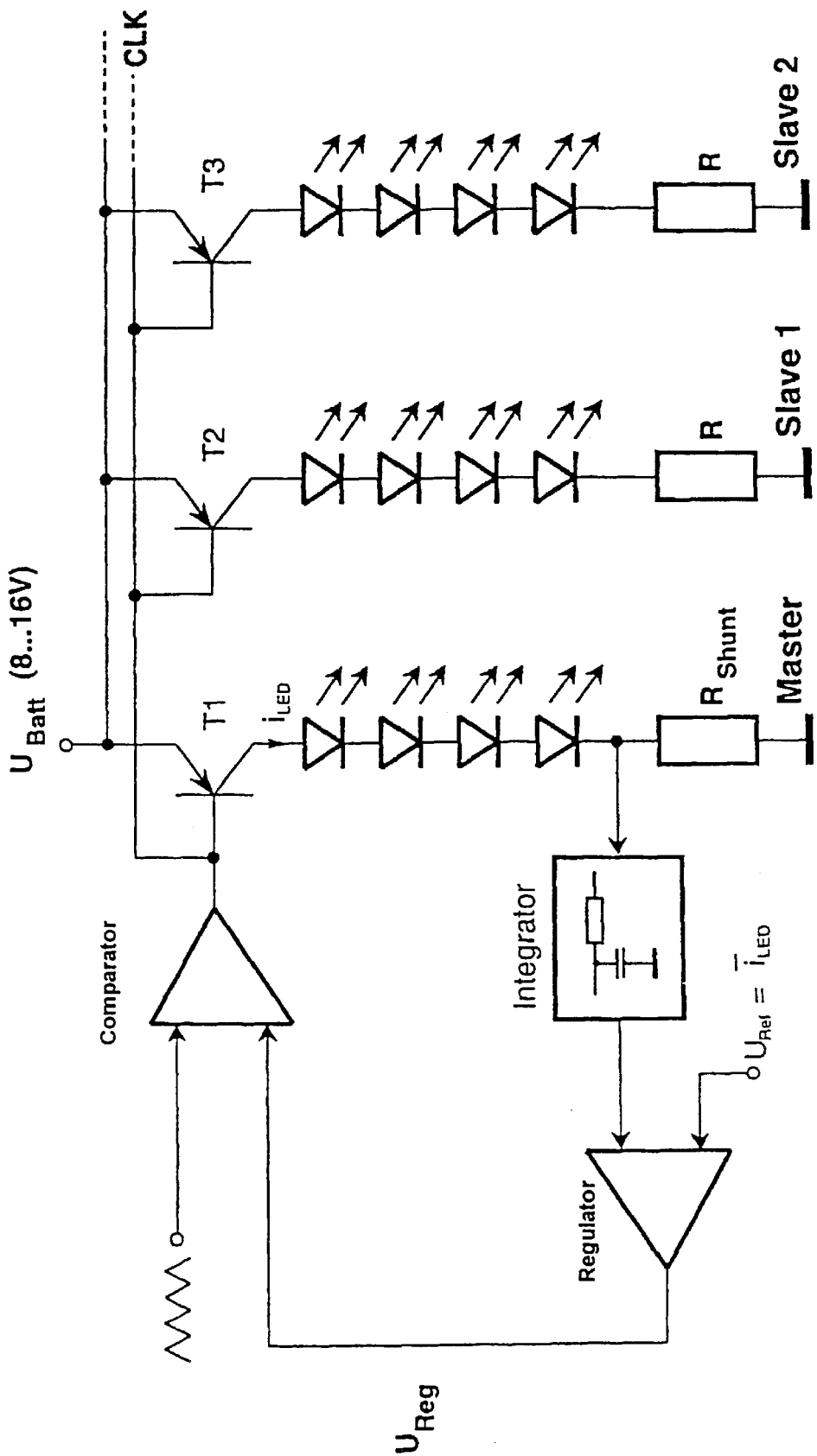
FIGS. 1 to 5 have already been described above.
Figure 2:
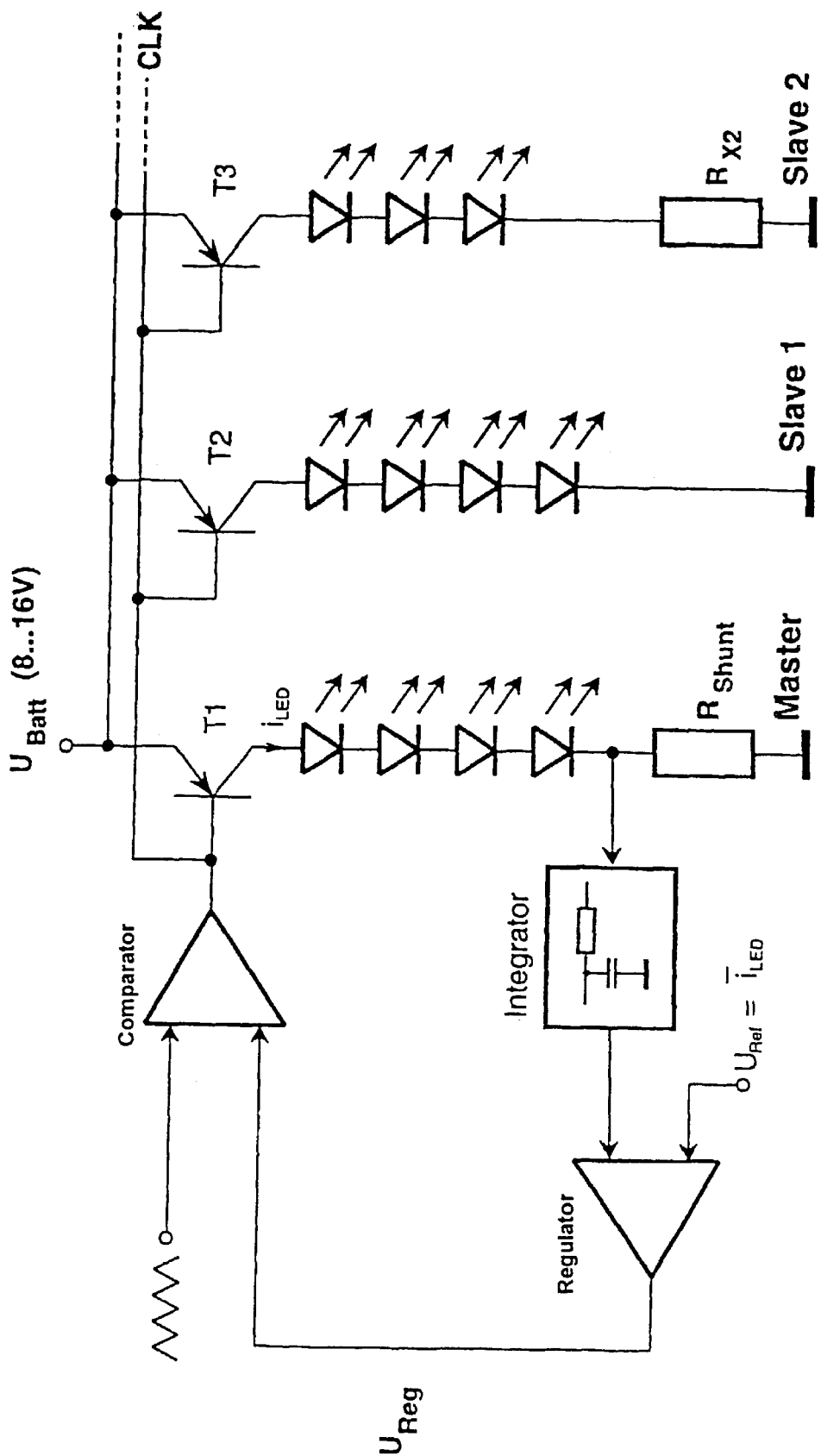
Figure 3:
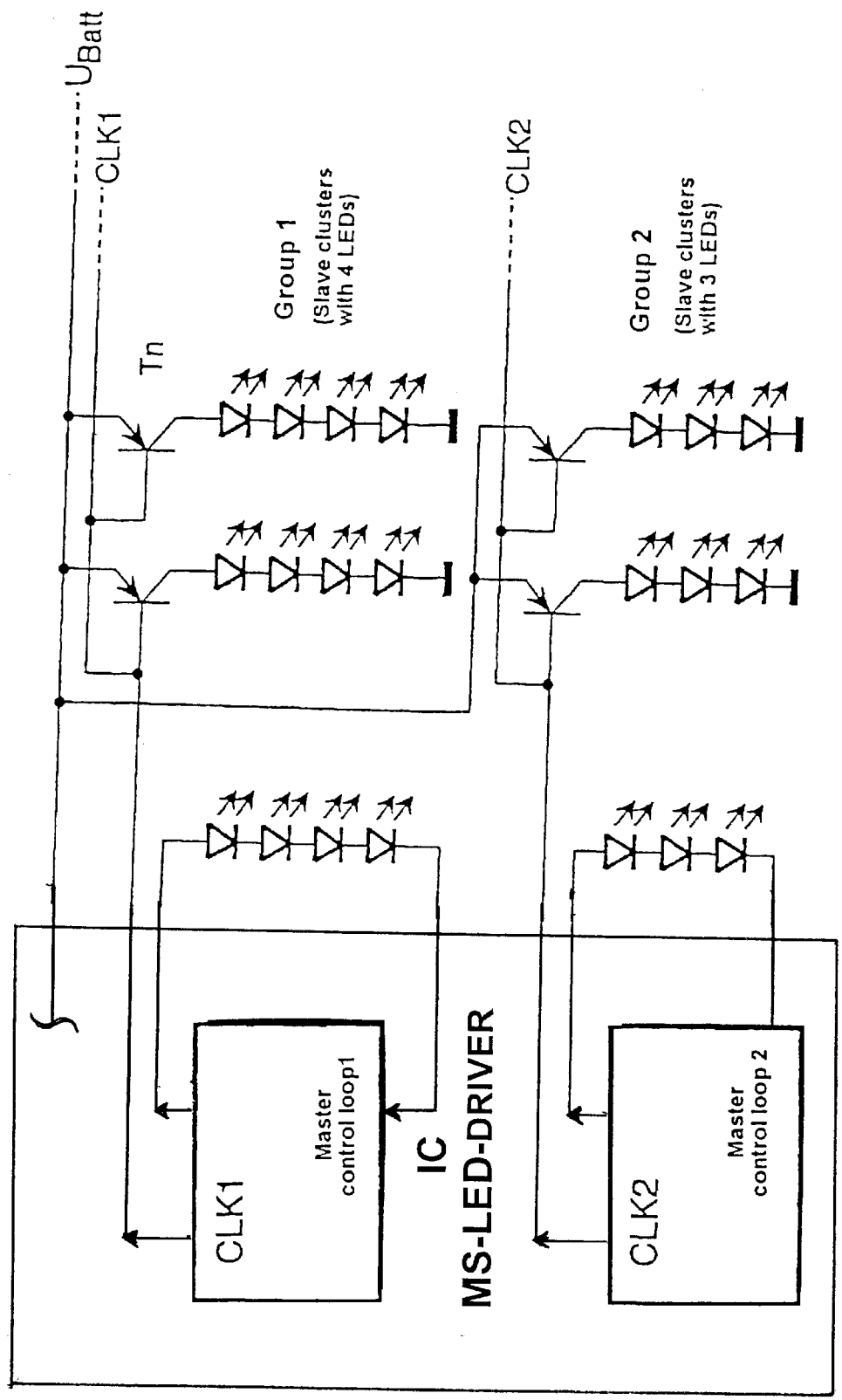
Figure 4:
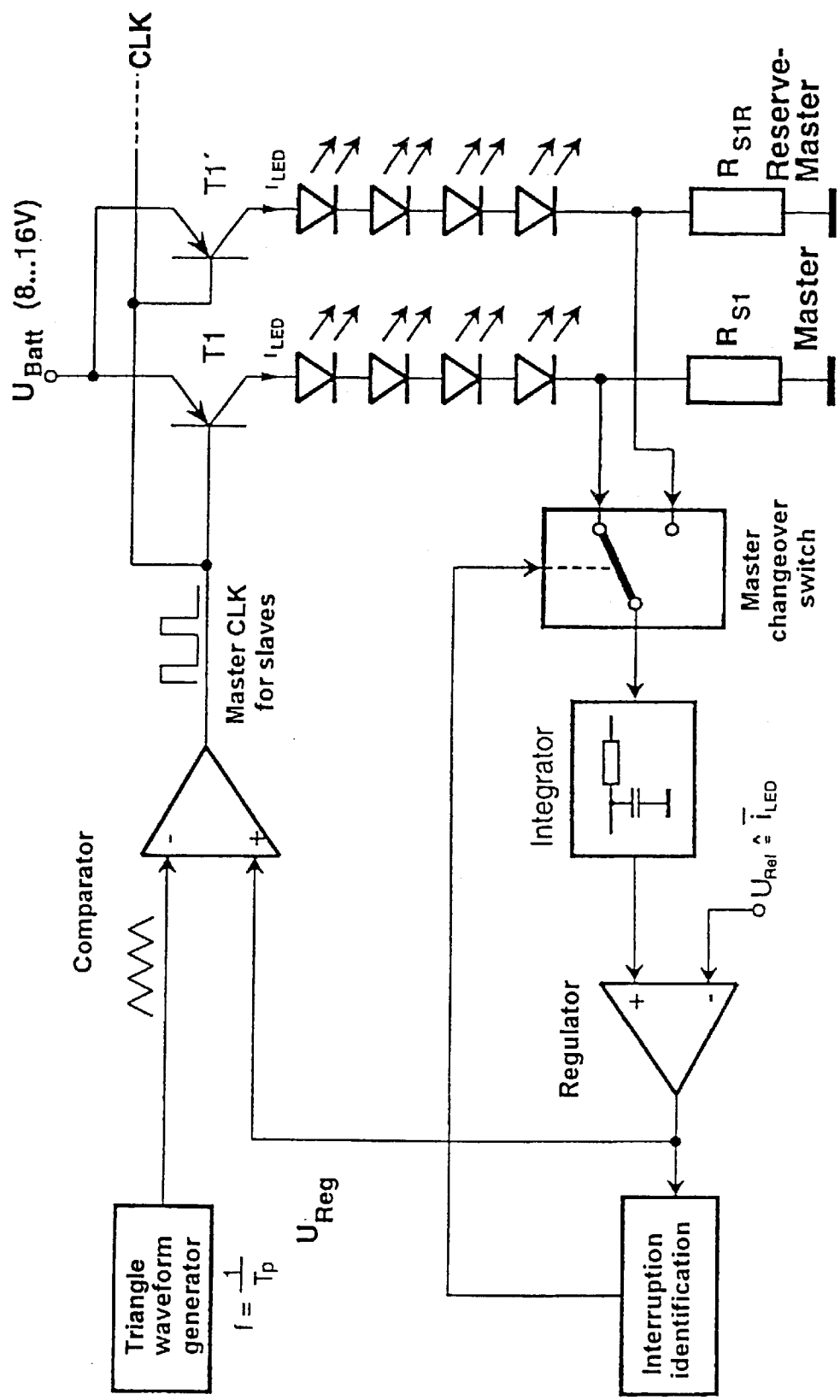
Figure 5:
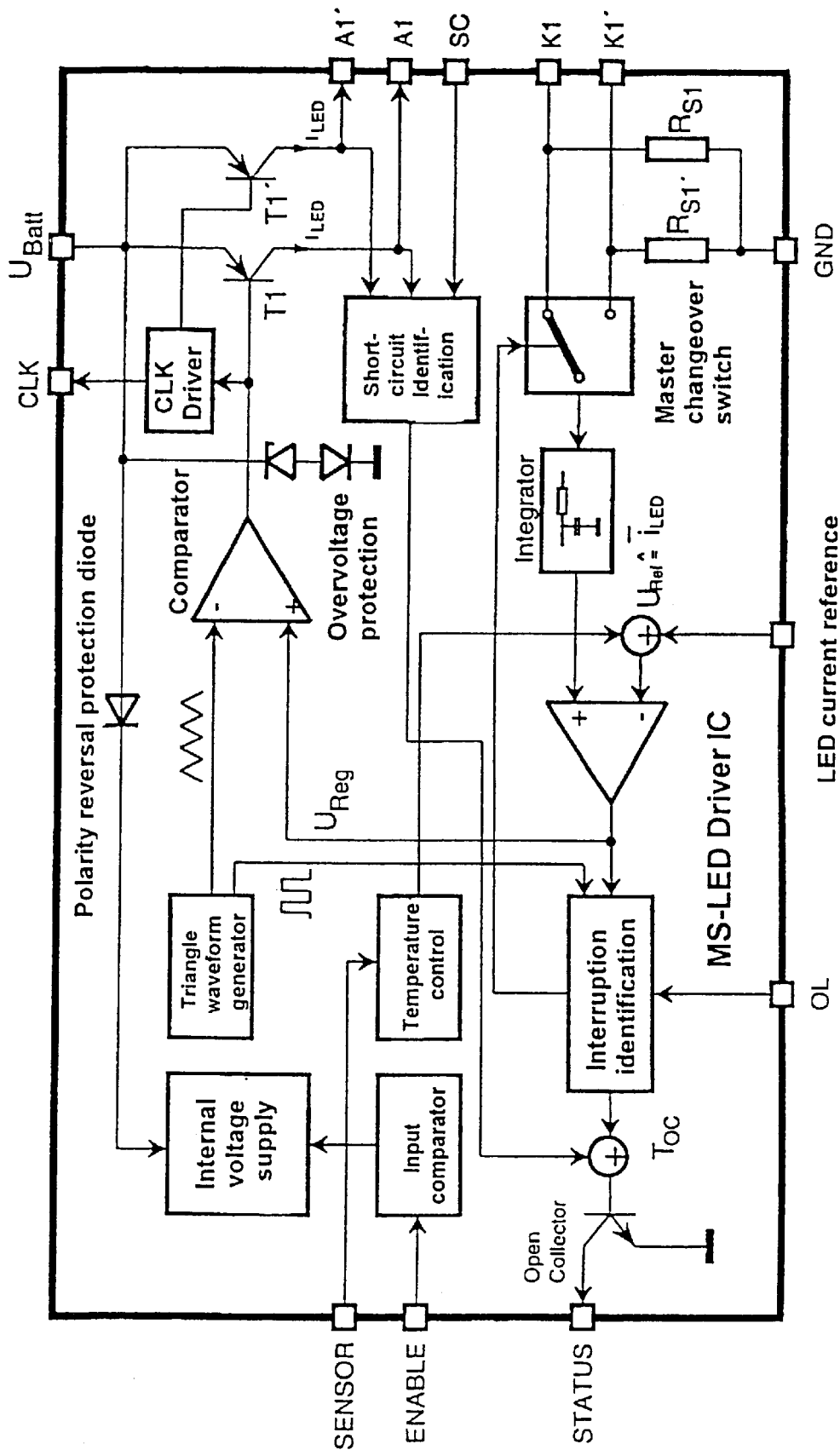
Figure 6:
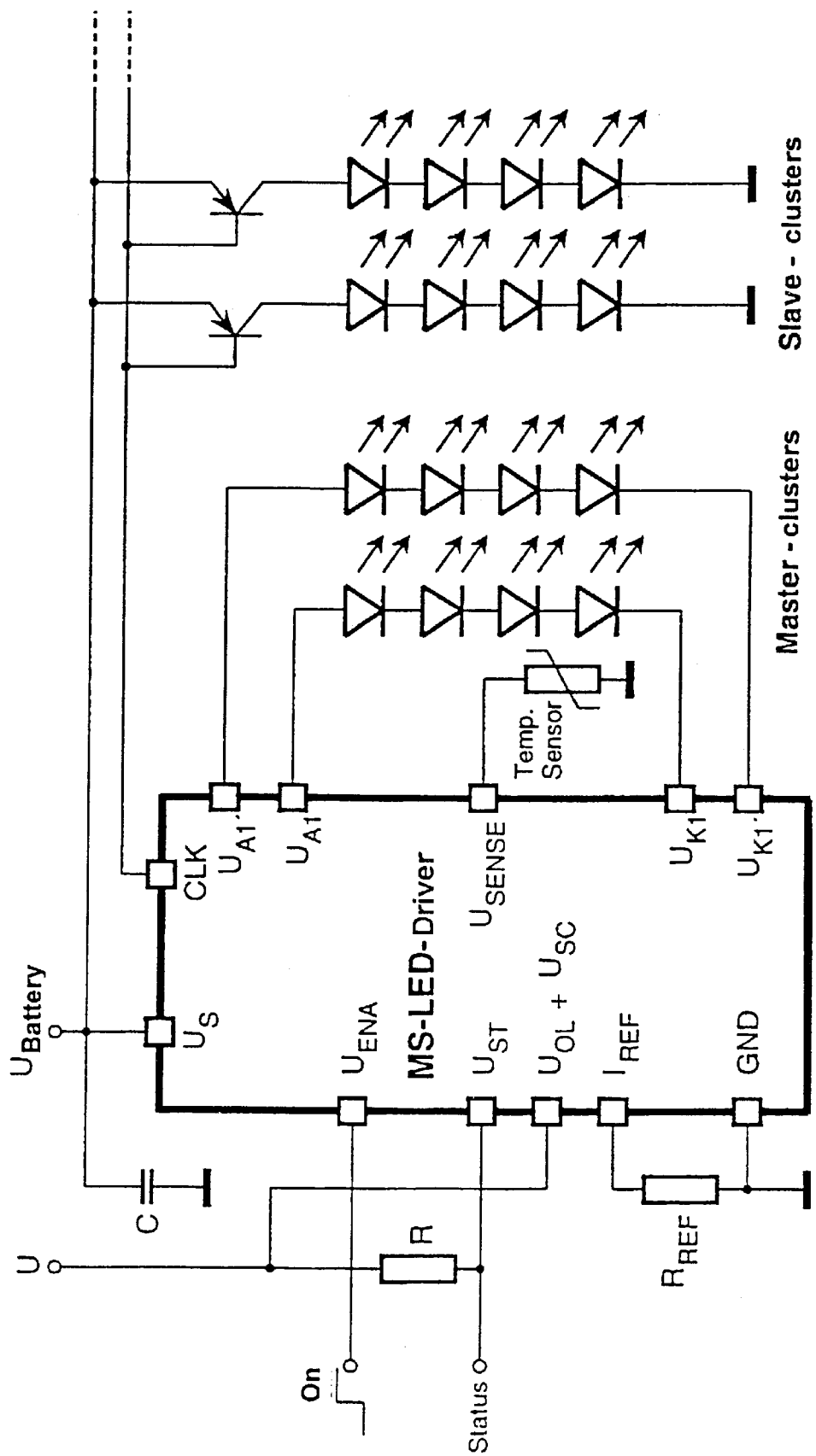

The schematic application circuit in FIG. 6 is illustrated without fault identification for the slave clusters. Details are illustrated in FIG. 8 of U.S. Pat. No. 6,400,101. The slave clusters are controlled in groups by the associated, regulated master cluster. In the situation where fault identification can be dispensed with in a particular application, the detector input or inputs (OL and SC) of the slave clusters must be connected to a fixed potential (for example HIGH).

Figure 7:
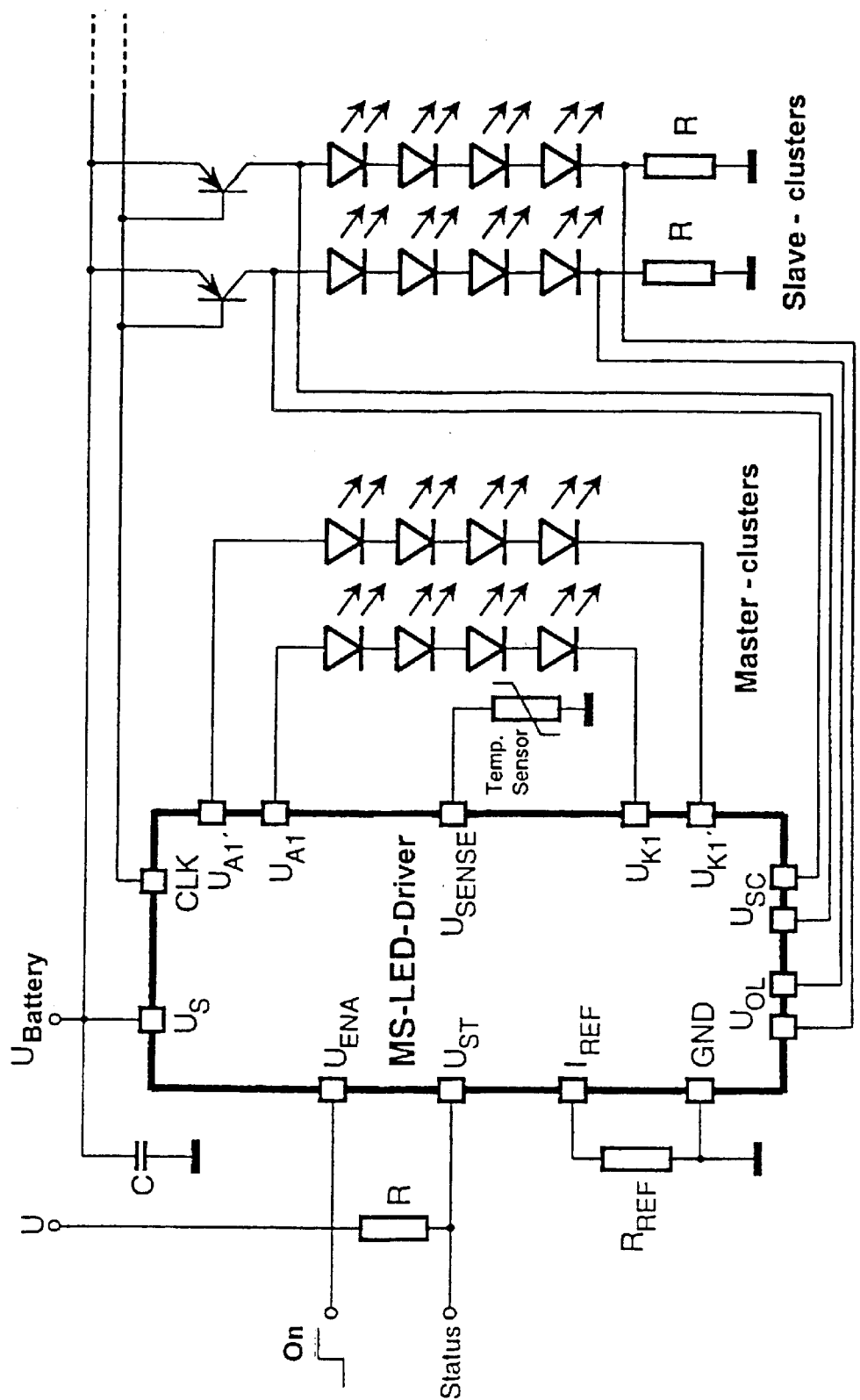

This different to the situation shown in FIG. 7. In this case, the detector inputs OL and SC are also used for fault identification in the slave clusters.

What is claimed is:

1. A drive circuit for LED arrays comprising:

at least two clusters of LEDs, in which one cluster comprises a number of LEDs arranged in series which are connected to a supply voltage, a semiconductor switch being arranged in series between each LED cluster and the supply voltage for allowing LED current to be supplied in a pulsed manner, means for measuring a forward current including a measurement resistor arranged in series with the LEDs in at least one first LED cluster, in a path for the forward current, between the LEDs and ground, and a control loop controlling the semiconductor switch in the first LED cluster referred to as a master cluster such that a constant mean value of the LED current is achieved, wherein the master cluster has a predetermined number X of LEDs in the cluster, the control loop also driving at least a semiconductor switch in a second LED cluster referred to as a slave cluster.

2. The drive circuit as claimed in claim 1, wherein all the LED clusters which are additionally present each have the same number of LEDs as the master cluster, with the control loop of the master cluster also driving all the additional LED clusters.

3. The drive circuit as claimed in claim 1, wherein all the LED clusters which are additionally present have a number $X_n$ of LEDs, with the number $X_n$ being equal to X, and with an additional load including a resistor $R_{xn}$, being arranged in series with the LEDs in the LED cluster, if $X_n < X$.

4. The drive circuit as claimed in claim 1, wherein at least two groups of LED clusters whose numbers of LEDs differ each have an associated master cluster, with the number X of LEDs in a group of slave clusters matching the number in the associated master cluster.

5. The drive circuit as claimed in claim 1, wherein one of the slave clusters is in the form of a reserve master cluster, in that a means is provided for identifying an interruption in the control loop of the master cluster and this means, for its part, is connected to a changeover switch in the control loop, with the changeover switch being connected on the one hand to the master cluster and on the other hand to the reserve master cluster, and being suitable for switching to the reserve master cluster if an interruption occurs in the master cluster.

6. The drive circuit as claimed in claim 1, wherein each LED cluster includes means for fault identification.

7. A method for operating a number of LED clusters, the method comprising the steps of:
   providing a master LED cluster equipped with a control loop which predetermines a clock frequency, and
   providing at least one slave LED cluster controlled by the clock frequency.

\* \* \* \* \*